July 7, 1970  V. A. RUKAS ET AL  3,518,721
SCREW EXTRUDER FOR REPROCESSING THERMOPLASTICS
Filed March 22, 1967  2 Sheets-Sheet 1

United States Patent Office 3,518,721
Patented July 7, 1970

3,518,721
SCREW EXTRUDER FOR REPROCESSING THERMOPLASTICS
Vasily Alexandrovich Rukas, Ul. Putny 13, kv. 54; Eduard Stanislavovich Kienovsky, Ul. Malaya Vidurine 20; Rimgaudas-Pranas Pranovich Minalga, Ul. Zholino 2-a, kv. 29, all of Vilnus, U.S.S.R.
Filed Mar. 22, 1967, Ser. No. 625,092
Claims priority, application U.S.S.R., Mar. 29, 1966, 1,064,524
Int. Cl. B29f 3/02
U.S. Cl. 18—12                                                    3 Claims

ABSTRACT OF THE DISCLOSURE

An extruder for reprocessing waste thermoplastic material, said extruder comprising a screw with a plurality of blades and a multiple screw thread between said blades. The thread of the multiple screw thread has a concave, curvilinear cross-section with the concavity directed outwardly.

---

The present invention relates to improvements in screw extruders for reprocessing thermoplastics, mainly, factory waste and consumers' refuse.

Production of articles from granular and powdery thermoplastics is widely known.

Reprocessing of the thermoplastic refuse, e.g., film, requires special treatment methods. Normally, the refuse is first ground on slitter, rotary or other grinders; the ground material is granulated and then, in the form of granules, reprocessed into an article. This technique of reprocessing refuse is rather uneconomical, labor-consuming and leads to a deterioration of the physico-chemical and dielectric properties of articles obtained from the refuse. Moreover, the known reprocessing technique involves the loss of feed stock in mechanical and heat treatment due to dispersion of the material when grinding, and its burn-up when melting.

Deterioration of the dielectric properties of thermoplastics is due to the presence, in the ground material, of metal particles formed as a result of wear of the cutting elements of the grinder. Separation of metal from the ground material is not possible because of the viscosity of the latter. That is why the metal particles, after getting inside the extruder, together with the stock fed for granulation and subsequent reprocessing therein, cause premature wear of the equipment.

One of the installations for reprocessing thermoplastic refuse in the form of film into loose granules of high bulk density is described in the West German periodical "Kunststoffe," vol. 56, No. 4, 1966, pp. 275–276.

In this installation, the film refuse is first cut in a slitter grinder and fed to a precompressor, wherein the cuttings are partly sintered, and then ground once more in said slitter grinder. Therein the material is finally ground into uniform granules, the size of which depends upon the size of the screens. Ready granules are fed to a collector fitted with a tubular separator for separating and recovering those cuttings which are not fully compressed.

Bulk density of the granules produced in the installation from the film refuse varies from 330 to 365 g./cm.³ for polyolefines.

Thus, an installation of this type is only capable of reprocessing the film refuse without obviating the necessity for the grinding operation; as a final product there are obtained granules which are subject to further reprocessing into a ready article. Moreover, the bulk density of the granules is much lower than that of a granulated feed stock and depends upon the film thickness; as a result, the efficiency of the article-producing extruders tends to decrease. Besides, certain difficulties arise in preparing a degassed melt from the film refuse.

Also known is an extrusion machine of 6E2/30D/R type designed by the West Germany company Barmg-Harting, Barmer - Machinenfabrik Aktiengesellschaft, which is capable of reprocessing film refuse and crumbs directly into granules. However, said machine is not adapted for reprocessing shapeless rigid and solid pieces of refuse directly into an article per se.

It is apparent from the above analysis that the installations hereinabove described are unable to reprocess piece-shaped refuse of thermoplastics directly into an article.

Installations of another type are designed for reprocessing thermoplastic refuse into an article regardless of the mechanical state of the feed stock.

For instance, USSR author's Certificate No. 176,676, Cl. 39a⁴, 4⁰⁰, describes a machine for reprocessing thermoplastics, which is provided with a conical two-stage screw the initial blades of which follow Archimedes' spiral. The adopted shape of the blades permits one to readily reprocess piece-shaped refuse of thermoplastics into an article, providing the size of the pieces corresponds to the interblade space of the screw.

An advantage offered by the latter machine is that refuse reprocessing is speeded up considerably and becomes more economical. At the same time, the melting and homogenization of thermoplastic pieces require high energy expenditures for heating the casing of the extruder and for driving its screw.

In a case where the feed stock is fed to the machine in rigid and solid pieces, such as polythene or polypropylene bars, fully homogenized material cannot be continuously obtained at the outlet into the forming head.

In the known installations, specifically in those described hereinabove, homogenization is effected as a result of heating the material from the outside and its simultaneous compression when it is carried in the interblade space of the screw.

Since the melt is a non-Newtonian fluid, its flow in the interblade space of the screw is laminar and, therefore, the interlayer exchange within said melt is a slow-going process impeding the heat exchange inside the flow. For this reason, the known extruders are not capable of reprocessing piece-shaped material. It is known that, as the material is carried and compressed in the interblade space of the screw, flows transverse to said screw, develop in the melt, as well as counterflows, of which the transverse flows facilitate the heat exchange and homogenization of the material. Yet, these flows are also laminar and not effective enough in influencing the melting process.

The invention aims at the development of an extruder for reprocessing thermoplastics, which ensures, by way of intensifying the heat exchange within the melt flows, a more effective homogenization and degassing of the melt at the outlet into the forming head with a minimum expenditure of power and irrespective of the type of feed stock (film, pieces, powder or granules), said extruder also ensuring a stock pressure, required for forming said stock directly into an article, by making use of known elements of the feed zones of the screw.

The invention describes a screw extruder for reprocessing thermoplastics, wherein, according to the invention, provided between the screw blades is a multiple screw thread with a concave curvilinear cross section, its concavity being outwardly directed. Said thread is required for transforming the transverse laminar flows of the melt in the interblade space into turbulent flows.

When the melt flow gets into the concave portion of the thread and runs upon the crest of the neighbouring turn, there develop local eddyings in the flow and shifts occur between its layers transversely and longitudinally relative to the screw axis, thus causing intensive heat exchange in said layers and facilitating additional liberation of heat. Furthermore, the pressure from the screw surface acting on a stock piece, tends to increase, and, as a result, the stock is continuously pressed ot the most heated surface of the extruder casing, which fact also contributes to the speedy fusion of the stock piece.

The most desirable number of thread leads (turns) is from 3 to 6, which permits one to secure optimum operational conditions. A decrease in the number of thread turns results in a reduced number of eddyings in the turbulent flow, while an increase causes eddyings so small as to be practically unable to influence the heat exchange between the layers.

It is desirable that the depth of the screw thread not exceed 0.015–0.05 of the screw diameter so as to comply with the aforementioned requirements and to preclude stagnation of the melt on the screw surface.

An advantage of the present invention is, above all, that it obviates the necessity for grinding and granulating operations, requiring only the separation of large-size pieces of the stock, which is more effective and economical than grinding.

Another advantage of the invention is a higher efficiency, a reduction in the expenditure of power and in the consumption of feed stock, as well as reduction of production floor space and service personnel.

One more advantage offered by the invention is that it permits the production of ready articles directly from the refuse, if minor known alterations are introduced into the design of the screw.

Furthermore, the articles produced in accordance with the present invention have better physico-chemical and dielectric properties.

To summarize, the utilization of the present invention ensures a more economical and speedy reprocessing of refuse and production of articles from thermoplastics than are possible with known installations used for similar purposes.

The invention will be more apparent from the following description of exemplary embodiments and appended drawings, wherein.

Figure 1:
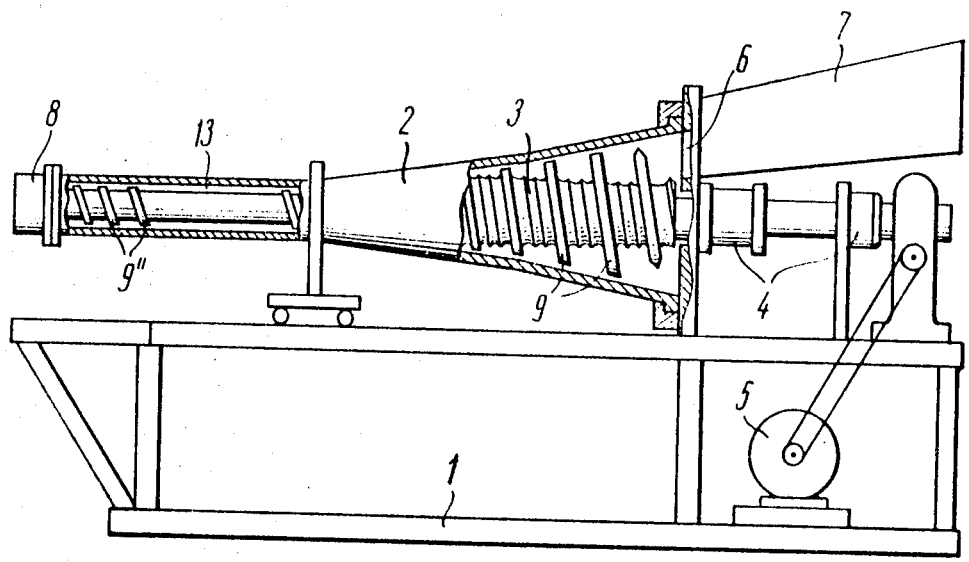
FIG. 1 is an extruder according to the invention, in partial section.

The extruder is mounted on a frame 1 (FIG. 1) and has a casing 2 housing a screw 3 whose shank is placed in bearing supports 4 and coupled with a drive 5. For charging the stock into the extruder, the rear wall of the casing 2 has a window 6 and a chute 7, a forming head 8 being fixed in the front of the casing 2.

Figure 2:
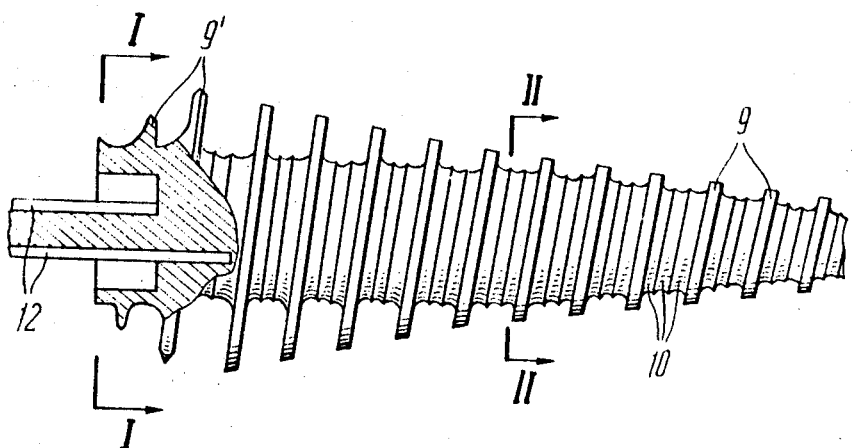
FIG. 2 is the screw of an extruder designed mainly for reprocessing the thermoplastic refuse in the form of film and pieces.
Figure 5:
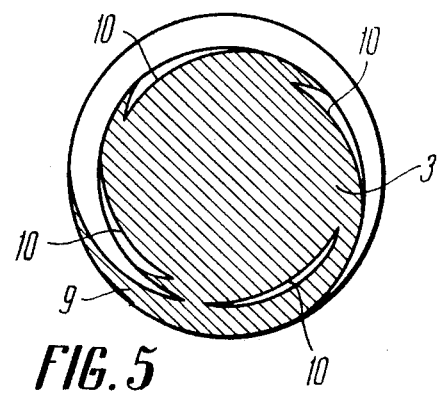
FIG. 5 is the screw of an extruder for reprocessing powdery and granular thermoplastics.
Figure 6:
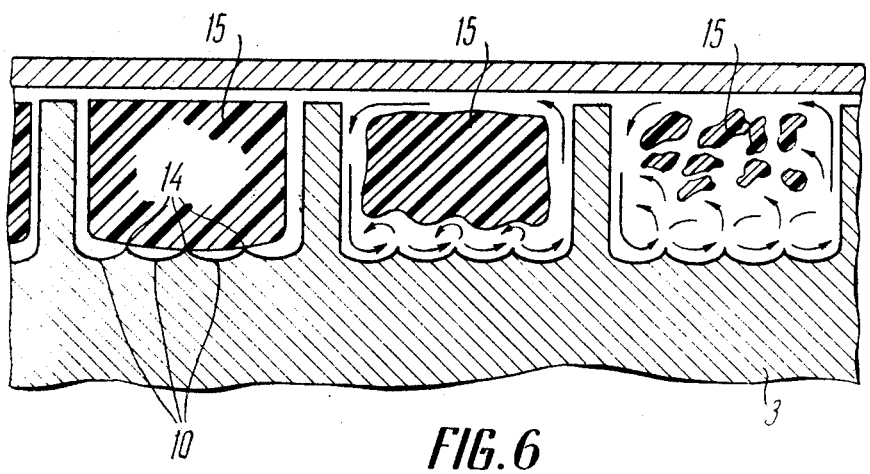
FIG. 6 is a partial longitudinal section of the extruder, wherein the direction of circulation of melt flows in the interblade space of the screw is indicated with arrows.

Referring to FIGS. 1, 2 and 5, there is a multiple screw thread 10 provided on the screw 3 between its blades 9, said thread 10 having a concave curvilinear cross section, with its concavity directed outwards, i.e. toward the casing 2 (FIG. 6).

When it is necessary to process the thermoplastic refuse in the form of film or clearance pieces, it is reasonable to make use of a multistage conical screw 3 shown in FIG. 2.

Figure 3:
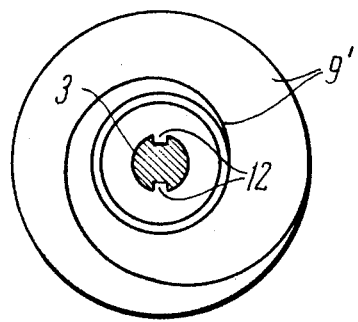
FIG. 3 is a section one line I—I of FIG. 1 (increased scale)

To facilitate the admission and further travel of the feed stock along the axis of the screw 3, its initial blades 9' (FIG. 3) are sharpened and fashioned on Archimedes' spiral so that their height increases in the direction of the feed stock travel.

Besides, provided in the butt portion of the screw 3 in the area where the stock is fed onto said screw, is a heating element 11 for warming the initial blades 9' so as to faciiltate the cutting of the material by said blades 9' and speed up its warming. Longitudinal grooves 12 (FIGS. 2 and 3) are provided in the screw 3 to bring the heat carrier to the depth of the initial blades 9' on the screw 3.

The number of leads of the thread 10 may vary from 3 to 6; in this case, a four-lead thread is provided, as shown in FIG. 5.

The depth of the thread 10 is between 0.015 and 0.05 of the diameter of the screw, while the pitch of the thread 10 is usually equal to the pitch of the blades 9.

The number of leads of the thread 10 and its depth depend upon the type of thermoplastics being processed, the depth of the thread 10 being constant throughout the screw length in the case of a conical screw.

The extruder with the screw 3 described hereinabove can be also used for reprocessing powdery and granular materials.

Figure 4:
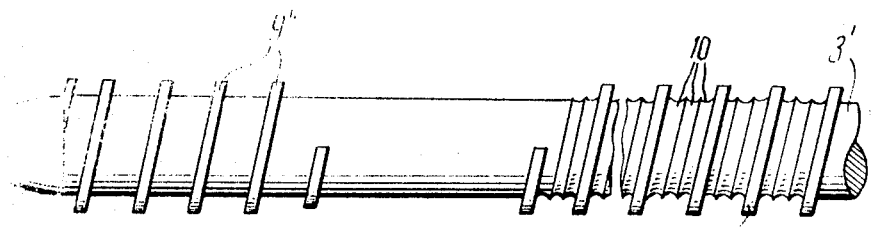
FIG. 4 is a section on line II—II of FIG. 2.

However, for reprocessing these stocks it is more reasonable to use an extruder with a straight screw 3' shown in FIG. 4. Said screw 3' also has a multiple screw thread 10 between its blades 9 with the cross-section described hereinabove. The screw 3' has extra blades 9" spaced at some distance from the main blades 9 so as to form a chamber 13 (FIG. 1). When the screw 3' is placed in the casing 2, said chamber 13 serving for degassing the melt and precluding the pulsation of the latter. All this is true for the conical screw described hereinabove. The parameters of the thread 10 are within the same limits.

The principle of operation of the present extruder can be illustrated by one of the embodiments of the invention, dealing with reprocessing large-size stock which are the most difficult for treatment.

The stock fed to the extruder is gripped and drawn inside by the blades 9' of the screw 3 to be then cut by said blades to pieces whose size depends upon the pitch of the blades 9. Concurrently, the stock is compressed and fused as it moves along the blades 9 of the screw 3, crests 14 (FIG. 6) of the screw thread 10 cutting in pieces 15 of the stock from beneath. In this case, the area of contact of the stock with the surface of the screw 3 will be much larger than that in the known extruders. Initial fusion of the stock is more intensive on the side of the heated casing 2 of the extruder.

The screw 3 rotating, the stock pieces 15 available between the blades 9 are displaced throughout the surface of the screw 3 relative the casing 2, thus forcing out the melt in a direction opposite to the direction of the stock movement. On encountering the blade 9, the melt flow makes a turn and comes under the piece 15, fusing it from beneath and pressing it against the inner surface of the casing 2.

Running upon the crests 14 of the thread 10, the melt flow eddies outwards, thus facilitating the interfusion of the layers and the heat exchange between the latter and the remaining portion of the stock piece 15.

Because of the same reasons there takes place a more intensive degassing of the melt, since its flow circulates transversely in relation to the screw 3, thus interfusing the layers. This, in its turn, permits to preclude the pulsation of the melt at the outlet into the forming head 8.

In case the film refuse is reprocessed, when it is difficult to ensure a uniform supply of the stock having rather a very low bulk density, the melt is stored under pressure and finally degassed in the chamber 13 (FIG. 1), wherein forced vacuumization of the melt can also be effected.

Industrial utilization of the invention fully proved the theoretical considerations set forth hereinabove as well as a high efficiency of the extruders thus designed.

When reprocessing polythene refuse in the form of rigid and solid pieces with a cross section of 70 x 100 mm. directly into pipes, the drive consuming 13.8 kwt., the output was 44.4 kg. of piping per hour.

When reprocessing film refuse, lengthy articles were obtained, the extruder output being 30 kg. per hour.

When reprocessing refuse into granules, the extruder output was 75 kg. per hour, the power consumption being the same as in the above-mentioned cases.

Power expenditure on heating the extruder casing and screw was 10 to 12 kwt./hr., i.e. 1.3–1.5 times less than the amount of power consumed by the known extruders, the output of the extruder being the same.

The physico-mechanical properties of articles, in particular of pipes, obtained from the refuse fully meet the requirements for articles made from the primary raw material.

We claim:

1. An extruder for reprocessing thermoplastics, which comprises a screw having a plurality of blades and a multiple screw thread between said blades, wherein the thread of said multiple screw thread has a concave curvilinear cross-section, with the concavity directed outwardly.

2. An extruder as claimed in claim 1, in which the number of leads on the thread is from 3 to 6.

3. An extruder as claimed in claim 1, in which the depth of the thread varies from 0.015 to 0.05 of the diameter of the screw.

References Cited

FOREIGN PATENTS 399,731    3/1966    Switzerland.

WILLIAM J. STEPHENSON, Primary Examiner